United States Patent [19]
Hosoda

[11] Patent Number: 5,047,909
[45] Date of Patent: Sep. 10, 1991

[54] POWER CONVERSION APPARATUS WITH HARMONIC FILTRATION

[75] Inventor: Hiromi Hosoda, Tokyo, Japan

[73] Assignee: Kabushiki Kaisha Toshiba, Kawasaki, Japan

[21] Appl. No.: 604,477

[22] Filed: Oct. 29, 1990

Related U.S. Application Data

[63] Continuation-in-part of Ser. No. 449,336, Dec. 11, 1989, abandoned, which is a continuation of Ser. No. 247,602, Sep. 22, 1988, abandoned.

[30] Foreign Application Priority Data

Sep. 28, 1987 [JP] Japan .................. 62-240809

[51] Int. Cl.$^5$ .................. H02M 1/12; H02M 1/14
[52] U.S. Cl. .................. 363/40; 318/806; 323/207; 363/44; 363/71; 363/159
[58] Field of Search .................. 363/39, 40, 44, 46, 363/65, 71, 157, 159, 160, 163; 323/207; 318/806

[56] References Cited

U.S. PATENT DOCUMENTS

| | | | |
|---|---|---|---|
| 3,825,815 | 7/1974 | Gyugyi et al. | 307/105 |
| 4,241,395 | 12/1980 | Stacey et al. | 363/39 |
| 4,377,780 | 3/1983 | Bjorklund | 363/35 |

FOREIGN PATENT DOCUMENTS

| | | | |
|---|---|---|---|
| 162773 | 9/1984 | Japan | 363/39 |
| 39374 | 3/1985 | Japan | 363/39 |
| 277065 | 12/1987 | Japan . | |

Primary Examiner—William H. Beha, Jr.
Attorney, Agent, or Firm—Foley & Lardner

[57] ABSTRACT

A power conversion apparatus capable of eliminating inexpedient higher harmonic components from its output, without lowering the conversion efficiency. The apparatus includes a first power converter for converting an input power from a power supply into an output power; a detector for detecting an output current and an output voltage of the first power converter; a high harmonic detector for detecting a higher harmonic component on a basis of the output current and the output voltage, and for producing current reference signal corresponding to the detected higher harmonic component; and a second power converter for producing an inverse of the detected higher harmonic component according to the current reference signal, and combining the produced inverse of the higher harmonic component with the output current of the first power converter such that the higher harmonic component in the output current of the first power converter are cancelled by the inverse of the higher harmonic component.

13 Claims, 7 Drawing Sheets

POWER CONVERSION APPARATUS WITH HARMONIC FILTRATION

This is a continuation-in-part application of our earlier copending, commonly assigned application Ser. No. 07/449,336 filed on Dec. 11, 1989, which is now abandoned, and which was a continuation application of our earlier application (abandoned) Ser. No. 07/247,602 filed on Sept. 22, 1988.

BACKGROUND OF THE INVENTION

1. Field of the Invention

The present invention relates to a power conversion apparatus such as a frequency converter or a rectifier and, more particularly, to such an apparatus equipped with harmonic filtration for eliminating inexpedient higher harmonics.

2. Description of the Background Art

Conventionally, frequency conversions of power supplies have been performed by devices such as a thyristor inverter or a cycloconverter. On the other hand, rectifications have been performed by devices such as a thyristor Leonard equipment.

These devices have in common a property that their switching frequencies are relatively low. This property causes the appearance of higher harmonics besides the fundamental one in their output currents.

These are devices whose outputs contain lesser amount of higher harmonics such as those using a power transistor or a gate turnoff. However, they are expensive to manufacture and have low conversion efficiency so that they are not suitable for dealing with large quantities. Furthermore, these devices induces higher harmonics in the power supply which perturb supply voltage, and this may affect the other apparatuses sharing the power supply.

On the other hand, there is a constraint regarding higher harmonics arising from the loading process. Namely, there is a case where a shaft connecting a motor and a driver is long and its resonant frequency coincides with that of a higher harmonic. An instance of such a case is when a power converter is used for variable-speed control of an alternating current motor where the presence of higher harmonics causes the appearance of torque-ripple, and the problem of resonant vibration of a shaft arises. Conventionally, such a case has been treated either by suppressing operations at the resonant frequency, or by employing devices with a lesser amount of higher harmonics of DC reactor, all having a common drawback of low conversion efficiency.

SUMMARY OF THE INVENTION

It is therefore an object of the present invention to provide a power conversion apparatus which can eliminate inexpedient higher harmonics from its output such that the problem of resonant vibration of a shaft do not arise, no higher harmonic is induced on the power supply, and high conversion efficiency can be achieved.

This object is achieved in the present invention by providing a power conversion apparatus with harmonic filtration, comprising: first power converter means for converting an input power from a power supply into an output power; detector means, connected to an output side of the first power converter means, for detecting an output current and an output voltage of the first power converter means; higher harmonic detector means, connected to the detector means, for detecting a higher harmonic component on a basis of the output current and the output voltage, and for producing current reference signal corresponding to the detected higher harmonic component; and second power converter means for producing an inverse of the detected higher harmonic component according to the current reference signal, and combining the produced inverse of the higher harmonic component with the output current of the first power converter means such that the higher harmonic component in the output current of the first power converter means is cancelled by the inverse of the higher harmonic component.

Other features and advantages of the present invention will become apparent from the following description taken in conjunction with the accompanying drawings.

DETAILED DESCRIPTION OF THE PREFERRED EMBODIMENTS

Figure 1:
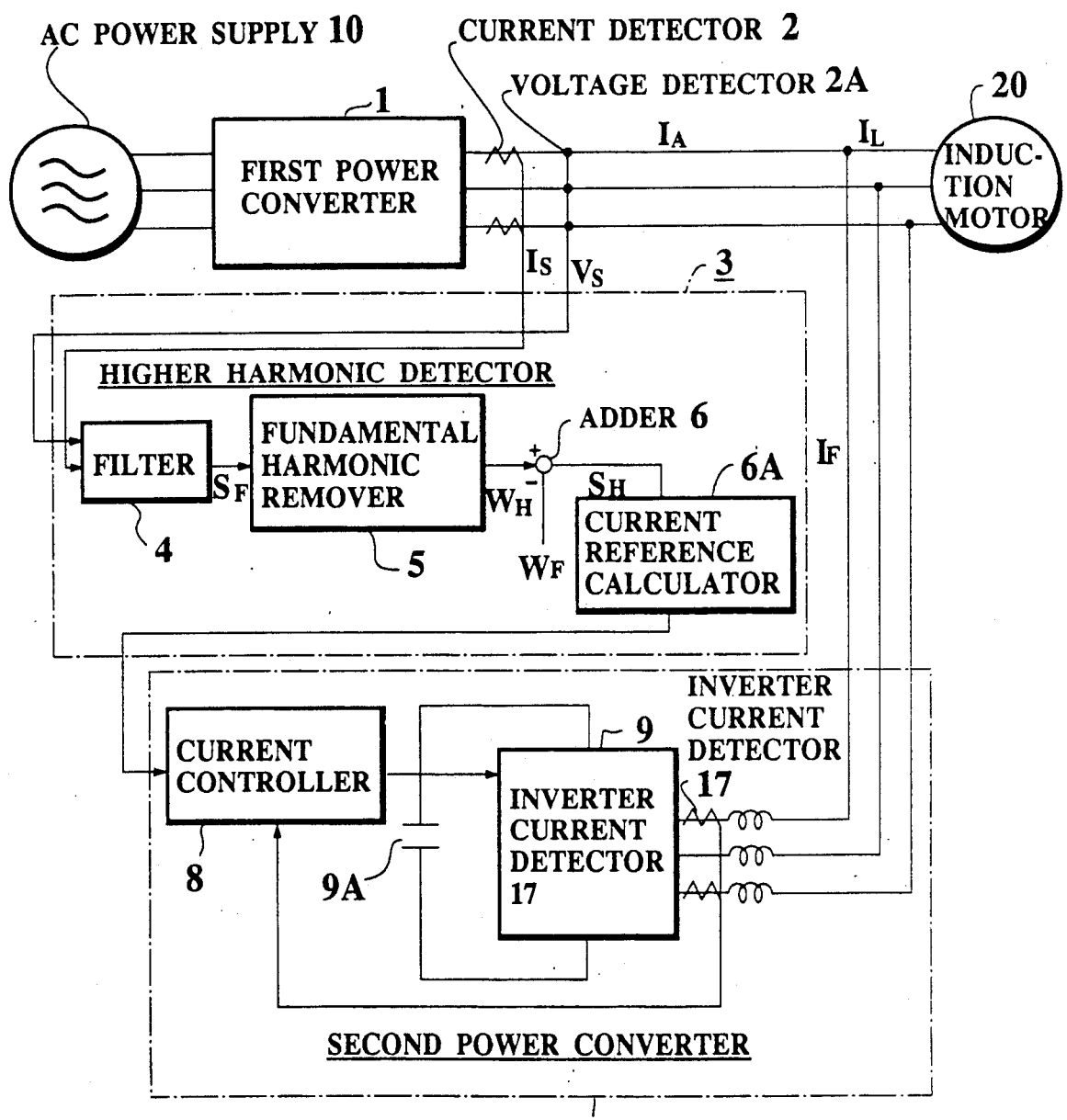
FIG. 1 is a block diagram of a first embodiment of a power converter according to the present invention.

Referring now to FIG. 1, there is shown a first embodiment of a power conversion apparatus according to the present invention. In this embodiment, the power conversion apparatus comprises a first power converter 1 such as a cycloconverter which receives inputs from an AC power supply 10 and produces alternating currents $I_A$ with a variable frequency, a current detector 2 attached at the output side of the first power converter 1 for detecting the alternating currents $I_A$ to produce a current $I_S$, a voltage detector 2A attached at the output side of the first power converter 1 for detecting output phase voltage $V_S$, a higher harmonic detector 3, and a second power converter 7. The higher harmonic detector 3 includes a filter 4, a fundamental harmonic remover 5, an adder 6 for producing higher harmonic components $S_H$ from $I_S$, and a current reference calculator 6A for obtaining a three phase current reference to be described below. The second power converter 7 includes a current controller 8, a capacitor 9A, an inverter 9 such as a power transistor or a gate turnoff to eliminate $S_H$ from $I_A$, and an inverter current detector 17 attached at an output side of the inverter 9. Output currents $I_L$ of the apparatus are loading an induction motor 20.

The further detail configuration of the fundamental harmonic detector 3 can be found in 'Compensation Characteristics of Active Power Filters using Multi-series Voltage Source PWM Converters' by Akagi, Atoh, and Nabae appearing in 'Collected Papers of the Society for Elecrics' Series B, 1986, pp. 563–570. Also, further detail configuration of the second power converter 7 can be found in 'Semiconductor Electric Power Converter' chapter 9, section 4, pp. 223-236 published by Denki Gakkai of Japan in 1987.

With this configuration, the input currents from the AC power supply 10 are converted by the first power converter 1 into the currents $I_A$ with the desired properties. The currents $I_S$ detected from $I_A$ by the current detector 2 and the voltage $V_S$ detected by the voltage detector 2A are fed to the higher harmonic detector 3. In the higher harmonic detector 3, two-phase currents $S_F$ are obtained at the filter 4 by means of vector decompositions such as commonly performed by conventional active filters, then fundamental harmonic component is removed from $S_F$ at the fundamental harmonic remover 5 to yield the higher harmonic components $W_H$. Furthermore, a part of the higher harmonic components $W_F$ which have no adverse effect are subtracted at the adder 6 to yield a part of the higher harmonic components $S_H$ to be eliminated. This subtraction of $W_F$ is incorporated so as to reduce the capacity of the second power converter 7. The current reference calculator 6A calculates the three phase current reference from $S_H$ obtained by the adder 6, and feeds this to the second power converter 7. This calculation of the current reference will be described in detail below. In the second power converter 7, the output current of the inverter 9 is controlled according to the current reference values and the output current of the inverter 9 detected by the inverter current detector 17, both of which are entering at the current controller 8, then $S_H$ are eliminated from $I_A$ at the inverter 9 by means of the cancellations due to either additions or subtractions of currents $I_F$ generated by the inverter 9 for this purpose. The resultant output currents $I_L$ are without inexpedient higher harmonics and therefore can be used to load the induction motor 20 without constraints.

Figure 6:
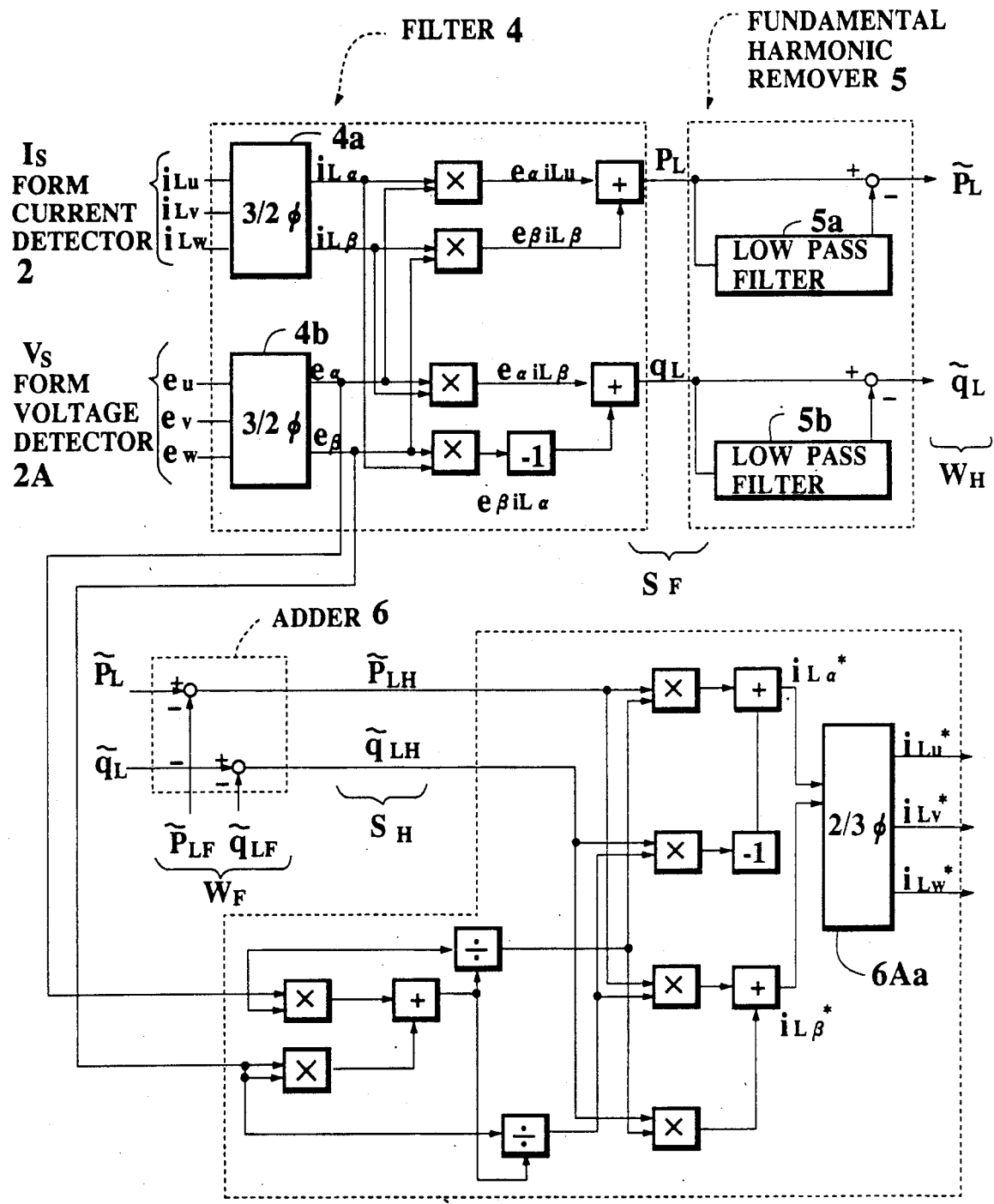
FIG. 6 is a detail block diagram of a main part of the first embodiment of FIG. 1.

Referring now to FIG. 6, the detail of the higher harmonic detector 3 will be described.

The filter 4 receives the output phase voltage $V_S(e_u, e_v, e_w)$ and the load current $I_S$ ($i_{LU}, i_{LV}, i_{LW}$), converts them into an orthogonal coordinate, and obtains an instantaneous active power $p_L$ and an instantaneous reactive power $q_L$ according to the following equations (1) to (3).

$$\begin{pmatrix} e_\alpha \\ e_\beta \end{pmatrix} = \sqrt{2/3} \begin{pmatrix} 1 & -1/2 & -1/2 \\ 0 & \sqrt{3}/2 & -\sqrt{3}/2 \end{pmatrix} \begin{pmatrix} e_u \\ e_v \\ e_w \end{pmatrix} \quad (1)$$

$$\begin{pmatrix} i_{L\alpha} \\ i_{L\beta} \end{pmatrix} = \sqrt{2/3} \begin{pmatrix} 1 & -1/2 & -1/2 \\ 0 & \sqrt{3}/2 & -\sqrt{3}/2 \end{pmatrix} \begin{pmatrix} i_{Lu} \\ i_{Lv} \\ i_{Lw} \end{pmatrix} \quad (2)$$

$$\begin{pmatrix} p_L \\ q_L \end{pmatrix} = \begin{pmatrix} e_\alpha & e_\beta \\ -e_\beta & e_\alpha \end{pmatrix} \begin{pmatrix} i_{L\alpha} \\ i_{L\beta} \end{pmatrix} \quad (3)$$

This calculation is achieved by the filter 4 as shown in FIG. 6, in which a three phase/two phase converters 4a and 4b obtain $i_{L\alpha}$, $i_{L\beta}$, $e_\alpha$, and $e_\beta$ according to the equations (1) and (2), and then a combination of multipliers, adders, and a polarity reversing circuit shown in FIG. 6 carries out the calculation of the equation (3) to obtain $p_L$ and $q_L$ which constitutes the two-phase currents $S_F$.

The fundamental harmonic remover 5 removes direct current parts $p_L$ and $q_L$ corresponding to the fundamental harmonic component from $p_L$ and $q_L$ obtained by the filter 4, by means of low pass filters 5a and 5b, to obtain alternating current parts $p_L$ and $q_L$ corresponding to the higher harmonic components $W_H$.

The adder 6 subtracts a part of the higher harmonic components $W_F$ constituted by $p_{LF}$ and $q_{LF}$ which have no adverse effect from the higher harmonic components $W_H$ obtained by the fundamental harmonic remover 5 in order to obtain a part of the higher harmonic components $S_H$ constituted by $p_{LH}$ and $q_{LH}$.

The current reference calculator 6A calculates two-phase current reference values $i_{L\alpha}*$ and $i_{L\beta}*$ from $e_\alpha$ and $e_\beta$ obtained by the three to two phase converter 4b of the filter 4 and $p_{LH}$ and $q_{LH}$ obtained by the adder 6 according to the following equation (4).

$$\begin{pmatrix} i_{L\alpha}* \\ i_{L\beta}* \end{pmatrix} = \begin{pmatrix} e_\alpha & e_\beta \\ -e_\beta & e_\alpha \end{pmatrix}^{-1} \begin{pmatrix} p_{LH} \\ q_{LH} \end{pmatrix} \quad (4)$$

This calculation is achieved by means of a combination of multipliers, dividers, adders, and a polarity reversing circuit shown in FIG. 6.

The current reference calculator 6A then obtains three-phase current reference values $i_{LU}*$, $i_{LV}*$, and $i_{LW}*$ from the two phase current reference values $i_{L\alpha}*$ and $i_{L\beta}*$ by using a two phase/three phase converter 6Aa according to the following equation (5).

$$\begin{pmatrix} i_{Lu}* \\ i_{Lv}* \\ i_{Lw}* \end{pmatrix} = \sqrt{2/3} \begin{pmatrix} 1 & 0 \\ -1/2 & \sqrt{3}/2 \\ -1/2 & -\sqrt{3}/2 \end{pmatrix} \begin{pmatrix} i_{L\alpha}* \\ i_{L\beta}* \end{pmatrix} \quad (5)$$

In the second power converter 7, the current controller controls the output current of the inverter 9 according to the three-phase current reference values obtained by the current reference calculator 6A and the output current of the inverter 9 detected by the current detector 17.

Figure 7:
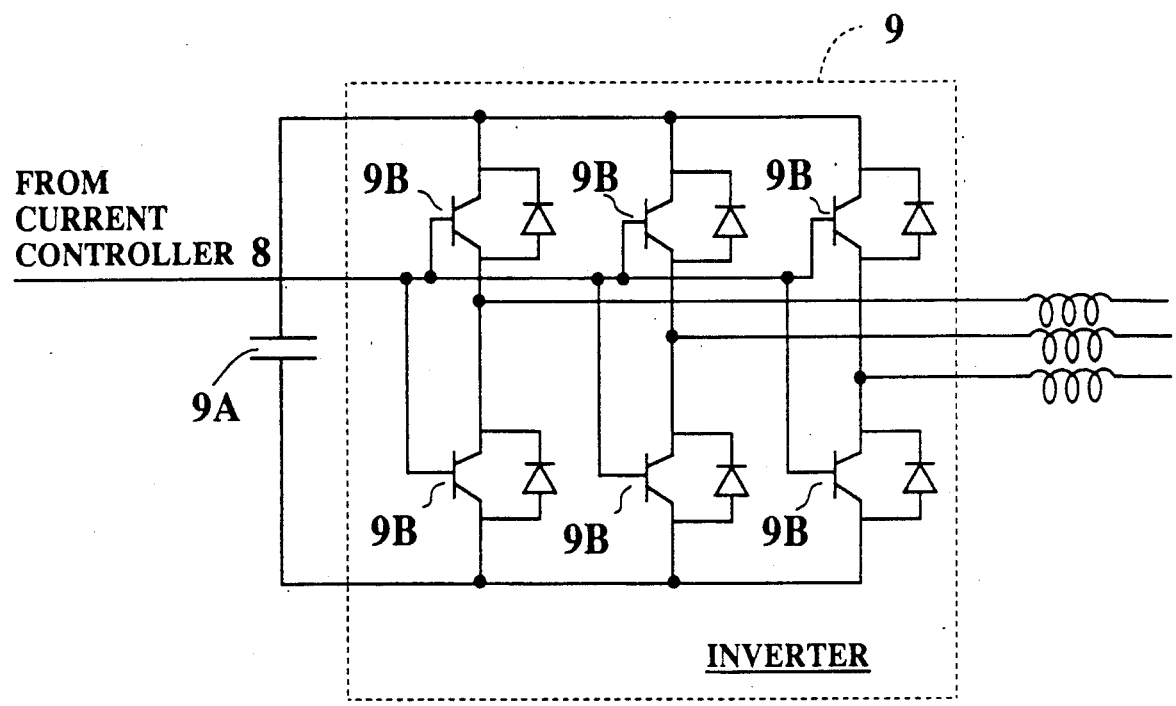
FIG. 7 is a detail block diagram of an inverter in the first embodiment of FIG. 1.

The inverter 9 in further detail has a configuration of a usual DC/AC inverter shown in FIG. 7, where the switching of the transistors 9B are controlled by the current controller 8, and which produces three-phase alternating currents $I_F$ of desired frequency. This construction of the second power converter 7 is well known to those skilled in the art, so that the further detailed description thereof is omitted.

To summarize, the output currents $I_A$ of the first power converter 1 are comprised of the fundamental harmonic component $I_K$ and the higher harmonic components $W_H$ which includes a part to be eliminated $S_H$ and a part not to be eliminated $W_F$. That is, $$I_A = I_K + W_{HH} = I_K + W_F + S_H \quad (6)$$

Now, by means of $I_F$ from the second power converter 7, the inexpedient higher harmonic components $S_H$ are absent from the output currents $I_L$. That is, $$I_L = I_A - I_F = I_K + W_H - I_F = I_K + W_F \quad (7)$$

Thus, it is possible in this embodiment to eliminate just those higher harmonics which have adverse effects, so that all the problems due to the presence of the higher harmonics can be prevented without unduly lowering the conversion efficiency. In addition, because only those higher harmonics to be eliminated are dealt with at the second power converter 7, it can be of relatively smaller capacity and the operations of the apparatus itself can be highly efficient, though this is not essential to the effectiveness of the present invention.

Now, the other embodiments of the present invention will be explained which can be most effectively construed as the variations of the previous embodiment. Consequently, those parts shown in the previous embodiment will be given the same labels in remaining figures and their explanations will be omitted in the following.

Figure 2:
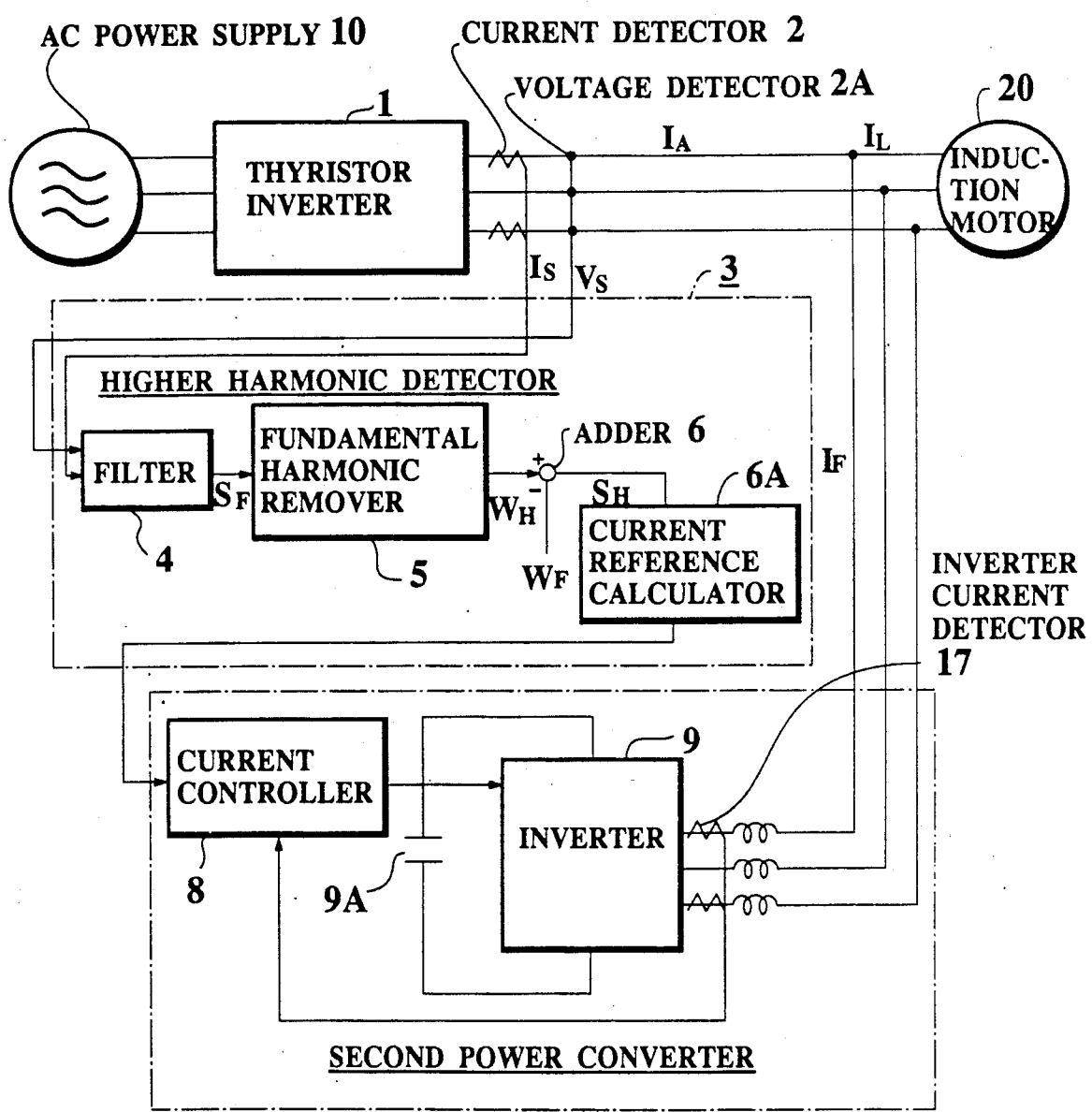
FIG. 2 is a block diagram of a second embodiment of a power converter according to the present invention.

Referring now to FIG. 2, there is shown a second embodiment of the present invention. In this embodiment, the first power converter 1 of the first embodiment is replaced by the thyristor inverter 1a, while all the other elements are unchanged. Apparently, this embodiment operates exactly the same manner as the first embodiment, so that the inexpedient higher harmonics can also be eliminated from the output of the thyristor inverter 1a.

Figure 3:
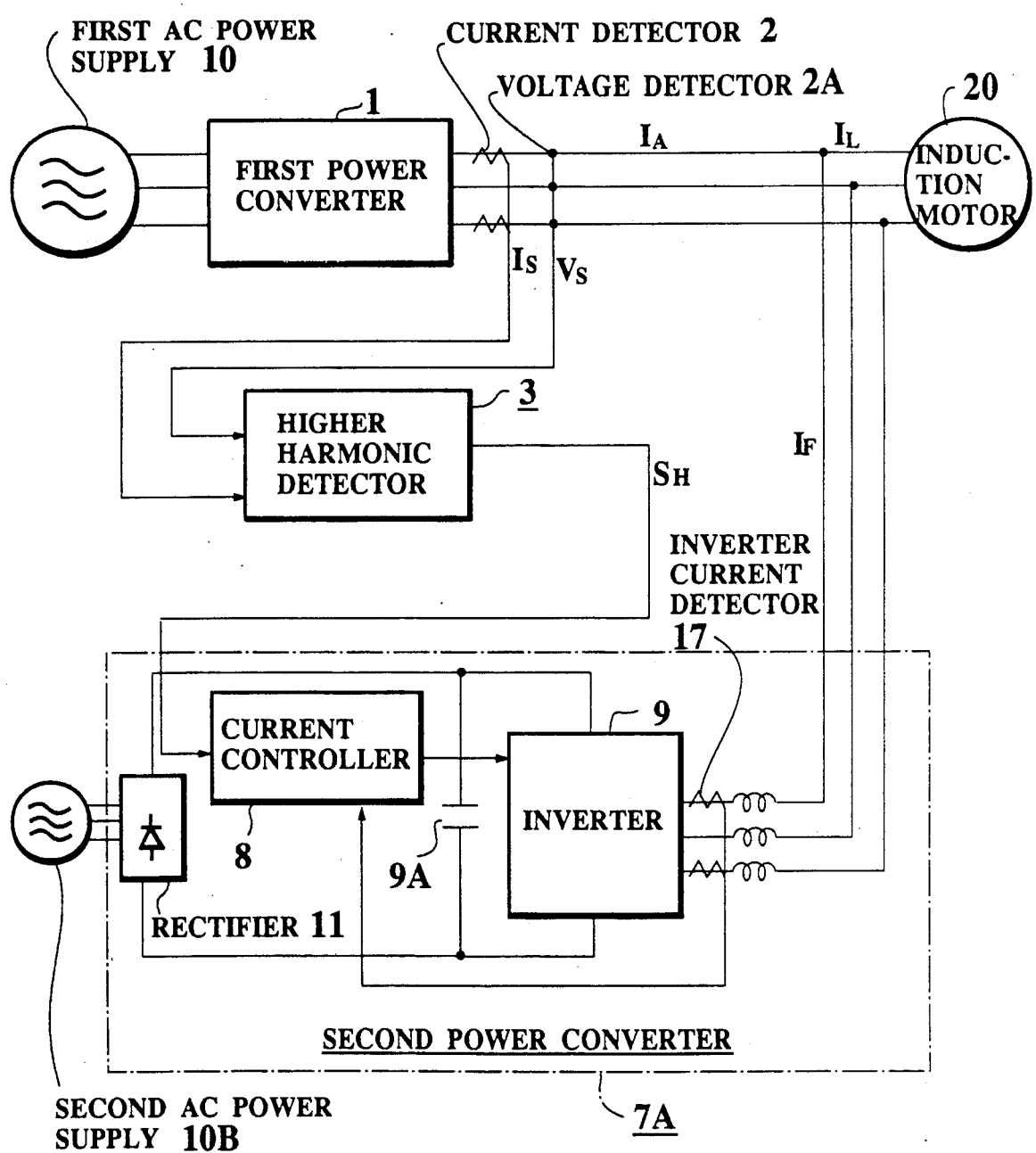
FIG. 3 is a block diagram of a third embodiment of a power converter according to the present invention.

Referring now to FIG. 3, there is shown a third embodiment of the present invention. In this embodiment, a rectifier 11 connected to another AC power supply 10B is incorporated into the second power converter 7A independently of an original AC power supply 10A so that no power loss will be caused at the second power converter 7, and thereby it is possible to improve the conversion efficiency of the apparatus.

Figure 4:
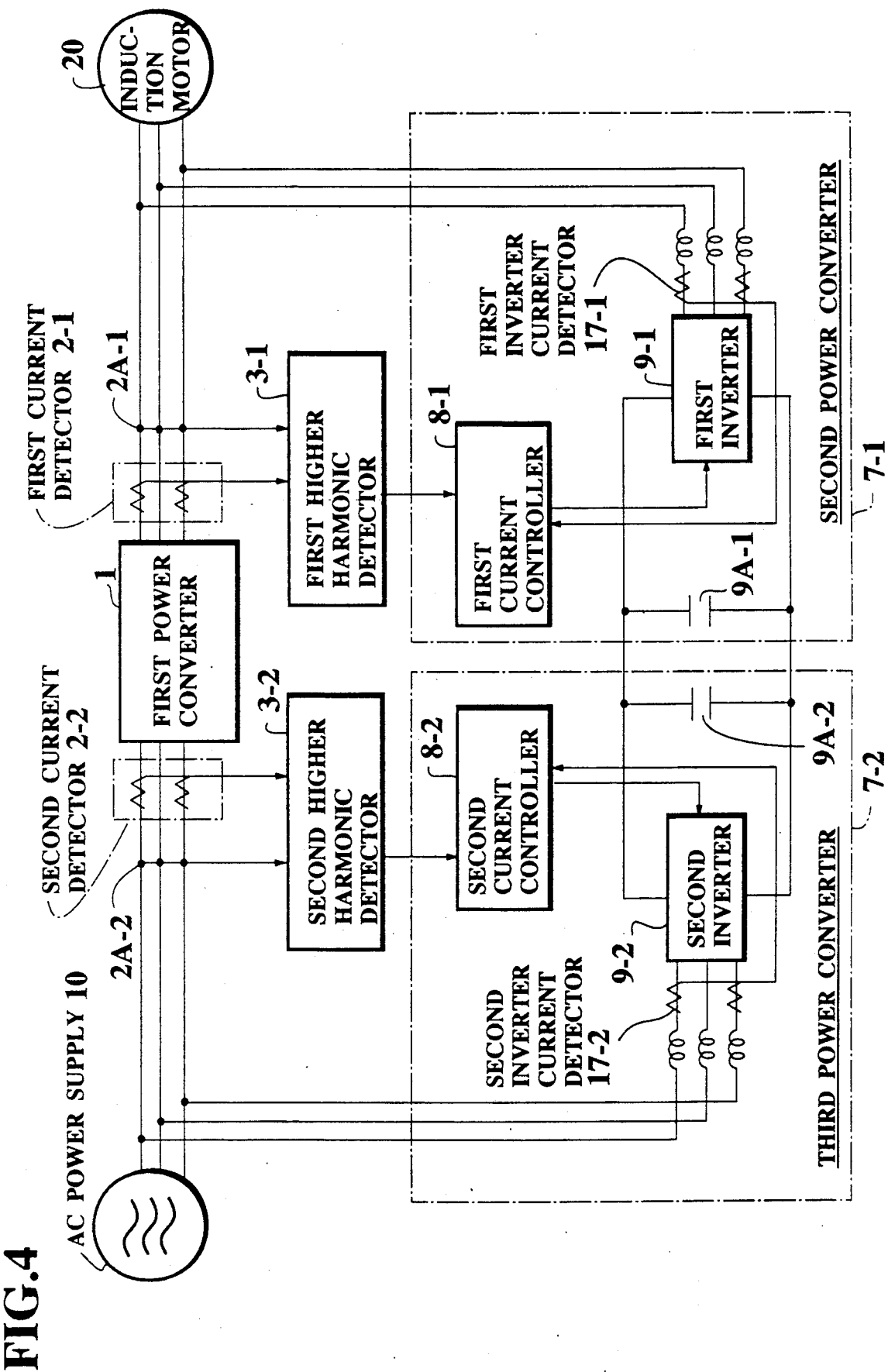
FIG. 4 is a block diagram of a fourth embodiment of a power converter according to the present invention.

Referring now to FIG. 4, there is shown a fourth embodiment of the present invention. In this embodiment, the apparatus includes a first current detector 2-1 attached at the output side of the first power converter 1, a first voltage detector 2A-1 attached at the output side of the second power converter 1, a first higher harmonic detector 3-1, a second power converter 7-1 including a first current controller 8-1, a first inverter 9-1, a first capacitor 9A-1, and a first inverter current detector 17-1, all of which are incorporated at the output side of the first power converter 1. Here, these elements incorporated at the output side of the first power converter 1 are identical to the corresponding elements of the first embodiment described above. In addition, the apparatus of this embodiment further includes a second current detector 2-2 attached at the input side of the first power converter 1, a second voltage detector 2A-2 attached at the input side of the second power converter 1, a second higher harmonic detector 3-2, and a third power converter 7-2 including a second current controller 8-2, a second inverter 9-2, a second capacitor 9A-2, and a second inverter current detector 17-2, all of which are incorporated at the input side of the first power converter 1. Here, these elements incorporated at the input side of the first power converter 1 are identical to the corresponding elements of the first embodiment, except that they are incorporated at the input side rather than the output side. In other words, in this embodiment, the apparatus of the first embodiment is doubly provided, one on the output side of the first power converter 1, the other on the input side of the first power converter 1. With this configuration, it is possible to eliminate inexpedient higher harmonic components induced on the AC power supply 10 by the first power converter 1 which have adverse effects on other apparatuses sharing this AC power supply 10, in addition to eliminating inexpedient high harmonic components having adverse effects on the loading side as in the first embodiment.

Figure 5:
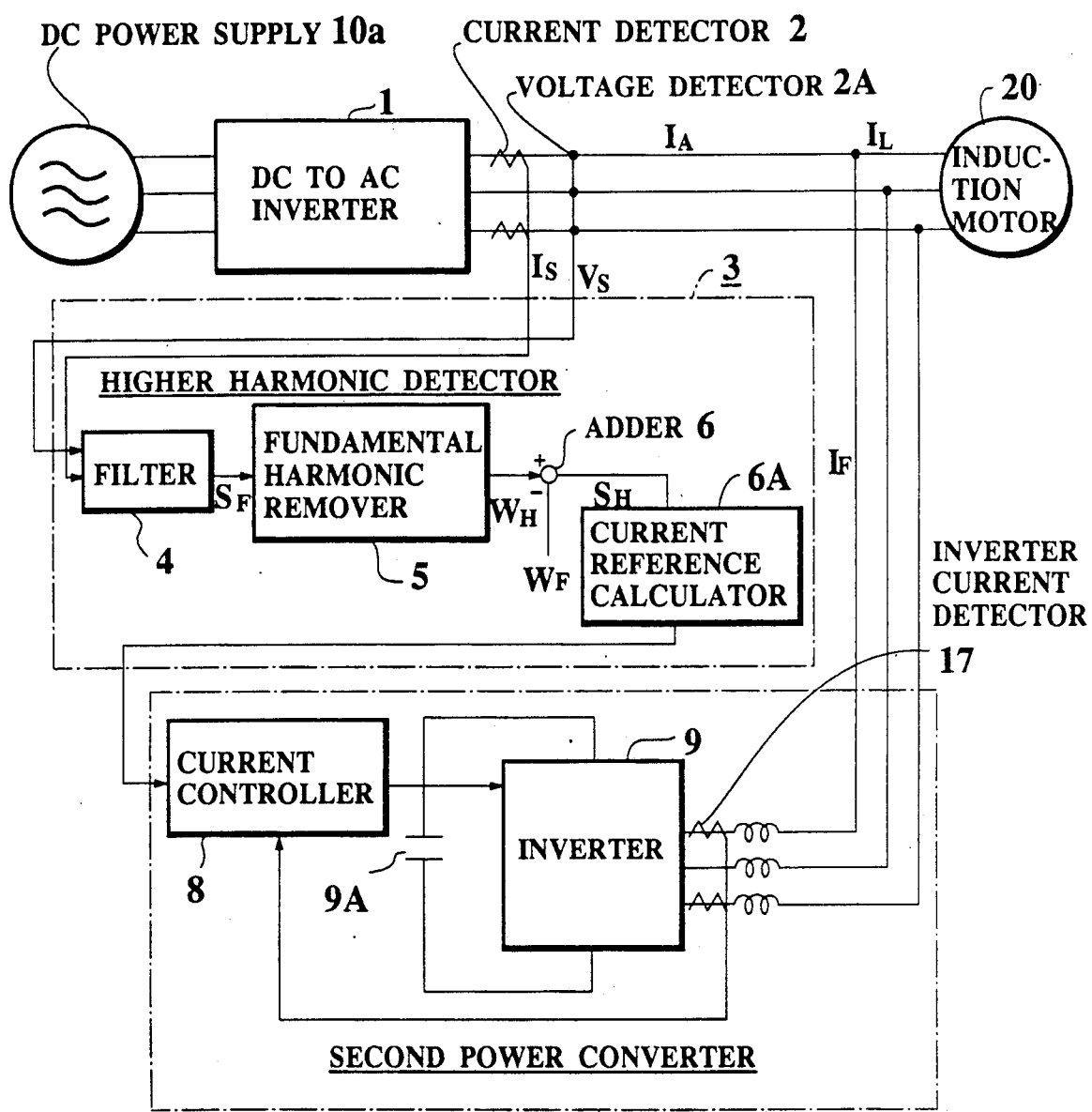
FIG. 5 is a block diagram of a variation of the first embodiment of FIG. 1.

It is obvious that in the similar manner, it is also possible to perform power conversion from DC inputs to AC outputs, as shown in FIG. 5, in which a DC to AC inverter 16 replaces the first power converter 1 of the first embodiment, while a DC power supply 10a replaces the AC power supply 10 of the first embodiment.

It can also be easily understood that in the embodiments described above, the same effects of the present invention can be achieved even when the second power converter 7 has the multiple-stage structure in order to improve its controllability.

Besides these, many modifications and variations of the above embodiments may be made without departing from the novel and advantageous features of the present invention. Accordingly, all such modifications and variations are intended to be included within the scope of the appended claims.

What is claimed is:

1. A power conversion apparatus with harmonic filtration, comprising:
   first power converter means for converting an input power from a power supply into an output power;
   detector means, connected to an output side of the first power converter means, for detecting an output current and an output voltage of the first power converter means;
   higher harmonic detector means, connected to the detector means, for detecting a higher harmonic component on a basis of the output current and the output voltage, and for producing current reference signal corresponding to the detected higher harmonic component; and
   second power converter means for producing an inverse of the detected higher harmonic component according to the current reference signal, and combining the produced inverse of the higher harmonic component with the output current of the first power converter means such that the higher harmonic component in the output current of the first power converter means is cancelled by the inverse of the higher harmonic component.

2. The apparatus of claim 1, wherein the higher harmonic detector means includes means for eliminating a predetermined higher harmonic component and a fundamental harmonic component.

3. The apparatus of claim 1, wherein the second converter means includes an additional independent power supply.

4. The apparatus of claim 1, further comprising:
   second detector means, connected to an input side of the first power converter means, for detecting an input current and an input voltage of the first power converter means;
   second higher harmonic detector means, connected to the second detector means, for detecting an input higher harmonic component on a basis of the input current and the input voltage, and for producing second current reference signal corresponding to the detected input higher harmonic component; and
   third power converter means for producing an inverse of the detected input higher harmonic component according to the second current reference signal, and combining the produced inverse of the input higher harmonic component with the input current of the first power converter means such that the input higher harmonic component in the input current of the first power converter means is cancelled by the inverse of the input higher harmonic component.

5. The apparatus of claim 4, wherein the second higher harmonic detector means includes means for eliminating a predetermined input higher harmonic component and a fundamental harmonic component.

6. The apparatus of claim 1, wherein the first converter means is a cycloconverter.

7. The apparatus of claim 1, wherein the first converter means is a thyristor inverter.

8. The apparatus of claim 1, wherein the second converter means comprises an inverter and a current controller for controlling the inverter in accordance with the current reference signal.

9. The apparatus of claim 8, wherein the inverter includes a power transistor.

10. The apparatus of claim 8, wherein the inverter includes a gate turnoff.

11. The apparatus of claim 1, wherein the input current from the power supply is an AC current.

12. The apparatus of claim 1, wherein the input current from the power supply is a DC current.

13. The apparatus of claim 1, wherein the higher harmonic detector means includes a filter means for obtaining two-phase current from the detected output current, a fundamental harmonic remover means for removing a fundamental harmonic component from the two-phase current in order to obtain the higher harmonic component, and a current reference calculator means for calculating the current reference signal in three-phase which is corresponding to the higher harmonic component.

* * * * *